Aug. 18, 1970                SHUJI KOYANAGI                3,524,695
            EIGHT ELEMENT OBJECTIVE WITH ANGULAR FIELD OF 72°
Filed Oct. 10, 1968                                 2 Sheets-Sheet 1

COMA ABERRATION

INVENTOR.
SHUJI KOYANAGI
BY
ATTORNEY

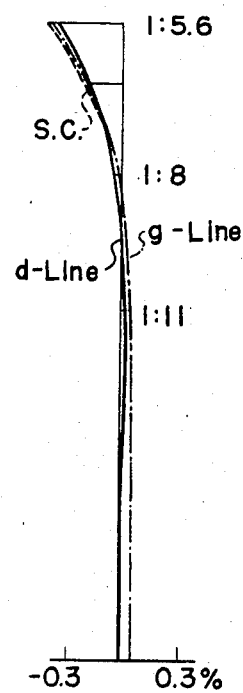
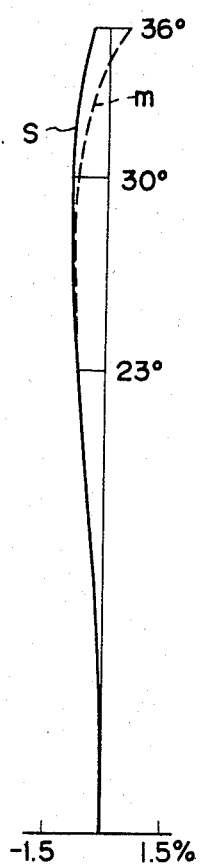
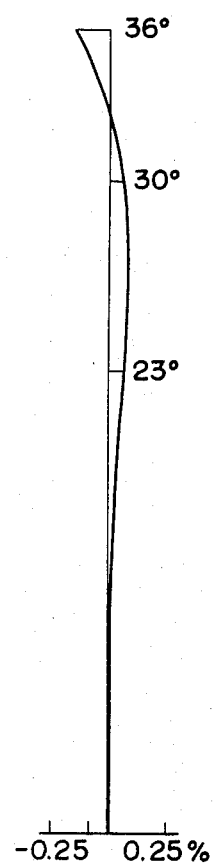
FIG. 4 — SPHERICAL ABERRATION (d-Line, g-Line) SINUSOIDAL CONDITION
FIG. 5 — ASTIGMATISM CURVATURE OF IMAGE
FIG. 6 — DISTORTION

United States Patent Office 3,524,695
Patented Aug. 18, 1970

3,524,695
EIGHT ELEMENT OBJECTIVE WITH ANGULAR FIELD OF 72°
Shuji Koyanagi, Tokyo, Japan, assignor to Canon Kabushiki Kaisha, Tokyo, Japan, a corporation of Japan
Continuation-in-part of abandoned application Ser. No. 382,524, July 14, 1964. This application Oct. 10, 1968, Ser. No. 770,137
Claims priority, application Japan, July 16, 1963, 38/36,168
Int. Cl. G02b 9/64, 11/34
U.S. Cl. 350—176                                    4 Claims

ABSTRACT OF THE DISCLOSURE

Wide angle lens having an angle of no less than 72 degrees with high resolving power and sharp contrast, in which optimum corrections are attained for aberrations, and which is useful in microfilm reproduction.

---

This application is a continuation-in-part of the application Ser. No. 382,524, filed July 14, 1964, which is now abandoned.

The present invention relates to a photographic wide-angle objective suitable for such use, where the distance to the object is required to be short and the objective itself has a wide angular field, i.e. is a wide-angle one, as in the case of microfilm reproduction.

It is one object of the invention to provide a photographic wide-angle objective which has a wide angle of no less than 72 degrees and optimum corrections attained for aberrations, especially for coma.

It is another object of the invention to provide a photographic wide-angle objective which has but little flare, but high resolving power and sharp contrast.

Other objects, advantages and features of the invention will become more apparent from the following description of illustrative embodiments when read in conjunction with the drawing in which:

FIG. 4 shows the graphs of spherical aberration and sine condition under the same conditions as FIG. 1;

FIG. 5 shows the graphs of astigmatism and curvature of image field under the same condition as FIG. 1; and FIG. 6 shows the graph of distortion of image under the same condition as FIG. 1.

Figure 1:
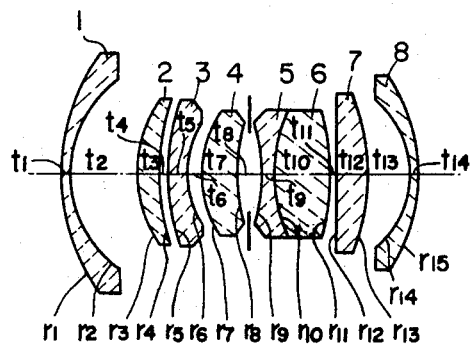
FIG. 1 is a schematic side-view of a photographic wide-angle objective in accordance with the invention.
Figure 2:
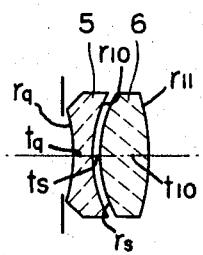
FIG. 2 is a portion of a modified embodiment of the inventive objective of FIG. 1.
Figure 3:
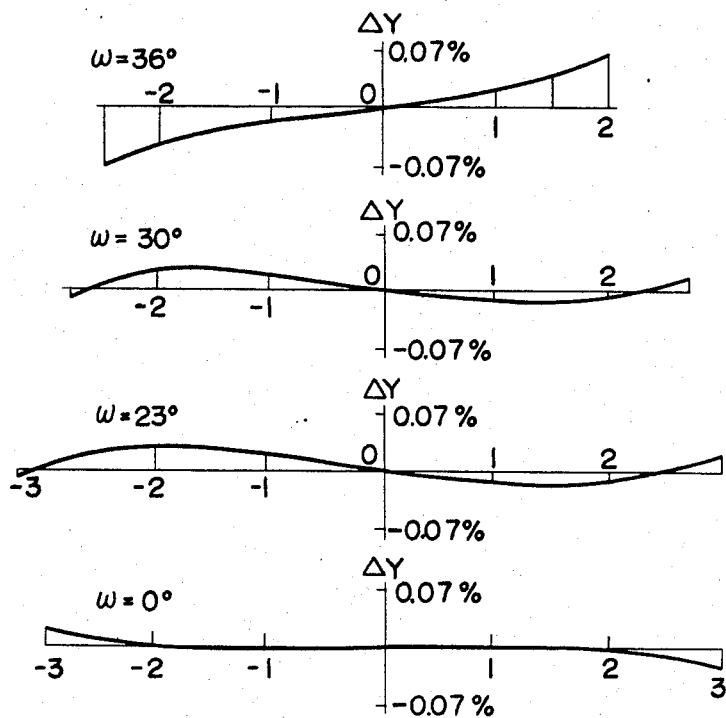
FIG. 3 shows the graphs of coma on the meridional plane for light rays incident at four different angles in the case of a magnification of 13.6:1 in an illustrative embodiment of the objective of FIG. 1.

Referring to FIG. 1 and FIG. 2 the photographic wide-angle objectives embodying the invention comprise eight lenses, of these the first, third and eighth are single negative menisci, the first and third lying with their convex surfaces turned toward the object and the eighth with its convex surface toward the image. The second, fourth and seventh lenses are single positive menisci, the second and fourth lying with their convex surfaces turned toward the object and the seventh with its con- vex surface toward the image, while the fifth and sixth lenses are respectively a positive and a negative single lens either cemented into a doublet, or coupled into a unit with a short spacing up to about $0.002f$ between the lenses where $f$ denotes the overall focal length.

This wide-angle objective, with its component lenses arranged as mentioned, satisfies the following conditions:

$1.65 > n_2 > 1.72$           $1.76 > n_6 > 1.864$
$1.67 > n_7 > 1.73$           $0.06 > n_6 - n_5 > 0.115$
  $0.25f < r_2 < 0.3f$            $0.25f < r_3 < 0.35f$
  $0.26f < r_7 < 0.35f$           $f < |r_9| < 1.3f$
  $0.8f < |r_{13}| < 1.21f$       $0.21f < |r_{14}| < 0.24f$
  $0.15f < t_2 < 0.18f$           $0.032f < t_6 < 0.045f$
  $0.02f < t_8 < 0.026f$          $0.1f < t_{13} < 0.14f$

Where $n$ denotes the refractive index for the D-line of the spectrum of each lens in the order $n$-subscripts; $r$ denotes the radius of curvature of each lens in the order of $r$-subscripts; $t$ denotes the thickness of each lens, or air spacing between lenses, on the optical axis, in the order of $t$-subscripts; and $f$ denotes the overall focal length.

Of these conditions for the wide-angle objective in accordance with the invention, $1.65 > n_2 > 1.72$ is a condition for minimizing spherical aberrations;

$$1.76 > n_6 > 1.864$$

$1.67 > n_7 > 1.73$ and $0.06 > n_6 - n_5 > 0.115$ being conditions for improving corrections for astigmatism and curvature of image field in the inner annular zone of the image as well as minimizing spherical aberrations, and the Petzval sum; $0.25f < r_3 < 0.35f$ and $0.8f < |r_{13}| < 1.21f$ those for minimizing coma from oblique light rays;

$$0.26f < r_7 < 0.35f$$

and $f < |r_9| < 1.3f$ those for improving corrections for coma and balancing the corrections for coma and spherical aberrations; $0.15f < t_2 < 0.18f$ and $0.032f < t_6 < 0.045f$ those for balancing the corrections for astigmatism and spherical aberrations;

$$0.02f < t_8 < 0.026f$$

that for improving the corrections for coma and spherical aberrations from oblique light rays; $0.1f < |r_{13}| < 0.14f$ that effective for minimizing the absolute size of coma; and $0.25f < r_2 < 0.3f$ and $0.21f < |r_{14}| < 0.24f$ those for balancing the corrections for coma and distortion of image.

This wide-angle objective may be divided into two groups of component members, namely the front and the rear group, with regard to the position of the stop which is provided between the fourth and the fifth lenses. Of the above conditions, the correction for aberrations in the central zone of the image is generally completed by the front group, and, the correction for aberrations in the inner annular and peripheral zones of the image is completed by the rear group, the balance of the corrections being completed by both groups. Such arrangement of the component members embodies an application of what is called the Rudolf's principle. The foregoing series of conditions required in accordance with the invention has resulted in a photographic wide-angle objective having but little flare coupled nevertheless with sharp contrast and high resolving power.

The following photographic wide-angle objectives are illustrative embodiments of the invention according to FIG. 1:

Overall focal length: $f=1$; relative aperture: 1:5.6; angular field: $2\omega=72°$.

| | | | |
|---|---|---|---|
| $r_1=0.4865$ | $t_1=0.0137$ | $n_1=1.5165$ | $v_1=64.1$ |
| $r_2=0.2711$ | $t_2=0.1637$ | | |
| $r_3=0.2867$ | $t_3=0.0617$ | $n_2=1.6583$ | $v_2=57.3$ |
| $r_4=0.7593$ | $t_4=0.0214$ | | |
| $r_5=0.8531$ | $t_5=0.0439$ | $n_3=1.6056$ | $v_3=43.9$ |
| $r_6=0.2626$ | $t_6=0.0395$ | | |
| $r_7=0.2812$ | $t_7=0.1003$ | $n_4=1.5596$ | $v_4=61.2$ |
| $r_8=1.5406$ | $t_8=0.0219$ | | |
| $r_9=-1.0477$ | $t_9=0.0458$ | $n_5=1.7495$ | $v_5=35.0$ |
| $r_{10}=0.3742$ | $t_{10}=0.1371$ | $n_6=1.8155$ | $v_6=44.4$ |
| $r_{11}=-1.0776$ | $t_{11}=0.0055$ | | |
| $r_{12}=-35.2349$ | $t_{12}=0.0740$ | $n_7=1.6935$ | $v_7=53.4$ |
| $r_{13}=-0.9079$ | $t_{13}=0.1096$ | | |
| $r_{14}=-0.2124$ | $t_{14}=0.0186$ | $n_8=1.5150$ | $v_8=54.3$ |
| $r_{15}=-0.4169$ | | | | where:

$r_1, r_2 \ldots$ denote the radii of curvature of the lenses in the order from the objective to the image side of the objective;

$t_1, t_2 \ldots$ the thickness is of the lenses or the air spacing between lenses on the optical axis in the stated order;

$n_1, n_2 \ldots$ the refractive indices of the lenses for the D-line of the spectrum in the stated order, and, $v_1, v_2 \ldots$ the Abbe numbers for the lenses in the stated order.

FIGS. 3 through 6 illustrate the graphs of various corrections for aberrations as attained in the exemplified embodiment of the invention at a magnification rate of 13.6:1; demonstrating how the corrections for aberrations are effectively and successively attained.

EXAMPLE 2

| | | | |
|---|---|---|---|
| $r_1=0.3787$ | $t_1=0.0139$ | $n_1=1.5165$ | $v_1=64.1$ |
| $r_2=0.2501$ | $t_2=0.1502$ | | |
| $r_3=0.2514$ | $t_3=0.0617$ | $n_2=1.6516$ | $v_2=58.5$ |
| $r_4=0.4927$ | $t_4=0.0212$ | | |
| $r_5=0.6314$ | $t_5=0.0516$ | $n_3=1.6056$ | $v_3=43.9$ |
| $r_6=0.2392$ | $t_6=0.0321$ | | |
| $r_7=0.2605$ | $t_7=0.1010$ | $n_4=1.5596$ | $v_4=61.2$ |
| $r_8=1.1496$ | $t_8=0.0201$ | | |
| $r_9=-1.0013$ | $t_9=0.0460$ | $n_5=1.7495$ | $v_5=35.0$ |
| $r_{10}=0.3602$ | $t_{10}=0.1170$ | $n_6=1.8160$ | $v_6=46.8$ |
| $r_{11}=1.1261$ | $t_{11}=0.0061$ | | |
| $r_{12}=-3.3753$ | $t_{12}=0.0601$ | $n_7=1.6910$ | $v_7=54.8$ |
| $r_{13}=-0.8002$ | $t_{13}=0.1009$ | | |
| $r_{14}=-0.2106$ | $t_{14}=0.0175$ | $n_8=1.5150$ | $v_8=54.3$ |
| $r_{15}=-0.3828$ | | | |

EXAMPLE 3

| | | | |
|---|---|---|---|
| $r_1=0.3128$ | $t_1=0.0152$ | $n_1=1.5187$ | $v_1=64.2$ |
| $r_2=0.2996$ | $t_2=0.1789$ | | |
| $r_3=0.3487$ | $t_3=0.0631$ | $n_2=1.6516$ | $v_2=58.5$ |
| $r_4=0.4678$ | $t_4=0.0219$ | | |
| $r_5=0.4828$ | $t_5=0.1049$ | $n_3=1.6056$ | $v_3=43.9$ |
| $r_6=0.2281$ | $t_6=0.0448$ | | |
| $r_7=0.3496$ | $t_7=0.1005$ | $n_4=1.5596$ | $v_4=61.2$ |
| $r_8=1.4101$ | $t_8=0.0259$ | | |
| $r_9=-1.2899$ | $t_9=0.0419$ | $n_5=1.7495$ | $v_5=35.0$ |
| $r_{10}=0.3471$ | $t_{10}=0.2520$ | $n_6=1.8630$ | $v_6=41.6$ |
| $r_{11}=-1.5959$ | $t_{11}=0.0089$ | | |
| $r_{12}=-1.9040$ | $t_{12}=0.0500$ | $n_7=1.7291$ | $v_7=54.8$ |
| $r_{13}=-1.2091$ | $t_{13}=0.1397$ | | |
| $r_{14}=-0.2395$ | $t_{14}=0.0194$ | $n_8=1.5111$ | $v_8=50.9$ |
| $r_{15}=-0.3065$ | | | |

The three examples shown above are photographic wide-angle objectives comprising eight elements with its fifth and sixth elements being cemented into a doublet.

With a slight modification, that is to say, as shown in FIG. 2, the fifth and sixth elements may well be air spaced from each other up to about $0.002f$ as aforementioned, and effective and successful corrections of aberrations are attained when the aforementioned conditions are satisfied. Three examples for the embodiment shown in FIG. 2 are as follows:

EXAMPLE 4

| | | | |
|---|---|---|---|
| $r_1=0.4891$ | $t_1=0.0137$ | $n_1=1.5165$ | $v_1=64.1$ |
| $r_2=0.2750$ | $t_2=0.165$ | | |
| $r_3=0.03$ | $t_3=0.062$ | $n_2=1.67$ | $v_2=57.3$ |
| $r_4=0.8336$ | $t_4=0.021$ | | |
| $r_5=0.7997$ | $t_5=0.0472$ | $n_3=1.6056$ | $v_3=43.9$ |
| $r_6=0.2779$ | $t_6=0.0385$ | | |
| $r_7=0.305$ | $t_7=0.1$ | $n_4=1.5596$ | $v_4=61.2$ |
| $r_8=1.0861$ | $t_8=0.023$ | | |
| $r_9=-1.15$ | $t_9=0.046$ | $n_5=1.7495$ | $v_5=35.0$ |
| $r_{10}=0.3676$ | $t_a=0.0018$ | | |
| $r_a=0.3698$ | $t_{10}=0.137$ | $n_6=1.816$ | $v_6=46.8$ |
| $r_{11}=-0.8999$ | $t_{11}=0.006$ | | |
| $r_{12}=-11.4143$ | $t_{12}=0.0761$ | $n_7=1.6935$ | $v_7=53.4$ |
| $r_{13}=-1.105$ | $t_{13}=0.1201$ | | |
| $r_{14}=-0.225$ | $t_{14}=0.019$ | $n_8=1.515$ | $v_8=54.3$ |
| $r_{15}=-0.4309$ | | | |

EXAMPLE 5

| | | | |
|---|---|---|---|
| $r_1 = 0.6202$ | $t_1 = 0.0137$ | $n_1 = 1.5165$ | $v_1 = 64.1$ |
| $r_2 = 0.2992$ | $t_2 = 0.179$ | | |
| $r_3 = 0.3401$ | $t_3 = 0.062$ | $n_2 = 1.713$ | $v_2 = 53.9$ |
| $r_4 = 1.5201$ | $t_4 = 0.021$ | | |
| $r_5 = 0.4762$ | $t_5 = 0.0773$ | $n_3 = 1.6056$ | $v_3 = 43.9$ |
| $r_6 = 0.2371$ | $t_6 = 0.0441$ | | |
| $r_7 = 0.3486$ | $t_7 = 0.1$ | $n_4 = 1.5596$ | $v_4 = 61.2$ |
| $r_8 = 0.4051$ | $t_8 = 0.0255$ | | |
| $r_9 = -1.2903$ | $t_9 = 0.046$ | $n_5 = 1.7495$ | $v_5 = 35.0$ |
| $r_{10} = 0.3254$ | $t_s = 0.0019$ | | |
| $r_s = 0.2998$ | $t_{10} = 0.137$ | $n_6 = 1.8155$ | $v_6 = 44.4$ |
| $r_{11} = -1.2991$ | $t_{11} = 0.006$ | | |
| $r_{12} = 5.5825$ | $t_{12} = 0.0990$ | $n_7 = 1.6968$ | $v_7 = 55.6$ |
| $r_{13} = -1.2017$ | $t_{13} = 0.1387$ | | |
| $r_{14} = -0.2385$ | $t_{14} = 0.019$ | $n_8 = 1.515$ | $v_8 = 54.3$ |
| $r_{15} = -0.2926$ | | | |

EXAMPLE 6

| | | | |
|---|---|---|---|
| $r_1 = 0.4844$ | $t_1 = 0.0137$ | $n_1 = 1.5165$ | $v_1 = 64.1$ |
| $r_2 = 0.2502$ | $t_2 = 0.152$ | | |
| $r_3 = 0.2591$ | $t_3 = 0.062$ | $n_2 = 1.651$ | $v_2 = 55.8$ |
| $r_4 = 0.6434$ | $t_4 = 0.021$ | | |
| $r_5 = 0.8338$ | $t_5 = 0.0446$ | $n_3 = 1.6056$ | $v_3 = 43.9$ |
| $r_6 = 0.2589$ | $t_6 = 0.0325$ | | |
| $r_7 = 0.2651$ | $t_7 = 0.1$ | $n_4 = 1.5596$ | $v_4 = 61.2$ |
| $r_8 = 1.745$ | $t_8 = 0.0203$ | | |
| $r_9 = -1.005$ | $t_9 = 0.046$ | $n_5 = 1.7495$ | $v_5 = 35.0$ |
| $r_{10} = 0.3702$ | $t_s = 0.0017$ | | |
| $r_s = 0.3770$ | $t_{10} = 0.137$ | $n_6 = 1.8155$ | $v_6 = 44.4$ |
| $r_{11} = -0.9263$ | $t_{11} = 0.006$ | | |
| $r_{12} = -28.0256$ | $t_{12} = 0.0698$ | $n_7 = 1.691$ | $v_7 = 54.8$ |
| $r_{13} = -0.8150$ | $t_{13} = 0.1006$ | | |
| $r_{14} = -0.2110$ | $t_{14} = 0.019$ | $n_8 = 1.515$ | $v_8 = 54.3$ |
| $r_{15} = -0.4302$ | | | |

In these Examples 4 through 6, the same notations as used with respect Examples 1 through 3 denote the same matter as defined in the foregoing, however, in Examples 4 through 6, $t_s$ and $r_s$ mean the air space between the fifth and sixth elements and the radius of curvature of the sixth element at the object side.

It will be understood that this invention is not limited to the specific materials, figures, etc., and other details described above and illustrated in the drawings, but can be carried out with various modifications without departing from the scope of the invention, as defined in the appended claims.

What is claimed is:

1. A photographic wide-angle objective comprising eight elements, the first, third and eighth being single negative menisci, the first and third lying with their convex surfaces turned toward the object and the eighth with its convex surface turned toward the image, the second, fourth and seventh being single positive menisci, the second and fourth lying with their convex surfaces toward the object and the seventh with its convex surface toward the image, and the fifth and sixth being respectively a negative and a positive lens cemented into a doublet the arrangement of the lenses satisfying the following conditions:

$1.65 > n_2 > 1.72$  $\qquad$  $1.76 > n_6 > 1.864$
$1.67 > n_7 > 1.73$  $\qquad$  $0.06 > n_6 - n_5 > 0.115$
$0.25f < r_2 < 0.3f$  $\qquad$  $0.25f < r_3 < 0.35f$
$0.26f < r_7 < 0.35f$  $\qquad$  $f < |r_9| < 1.3f$
$0.8f < |r_{13}| < 1.21f$  $\qquad$  $0.21f < |r_{14}| < 0.24f$
$0.15f < t_2 < 0.18f$  $\qquad$  $0.032f < t_6 < 0.045f$
$0.02f < t_8 < 0.026f$  $\qquad$  $0.1f < t_{13} < 0.14f$ where $n$ denotes the refractive index for the D-line of spectrum of each lens in the order $n$-subscripts; $r$ the radius of curvature of each lens in the order of $r$-subscripts; the $t$ thickness of each component on the optical axis, or air spacing between components, in the order of $t$-subscripts; and $f$ the overall focal length.

2. A photographic wide-angle objective according to claim 1 and comprising a total of eight component members and satisfying the following conditions:

Overall focal length: $f = 1$; relative aperture: 1:5.6; angular field: $2\omega = 72°$

| | | | |
|---|---|---|---|
| $r_1 = 0.4865$ | $t_1 = 0.0137$ | $n_1 = 1.5165$ | $v_1 = 64.1$ |
| $r_2 = 0.2711$ | $t_2 = 0.1637$ | | |
| $r_3 = 0.2867$ | $t_3 = 0.0617$ | $n_2 = 1.6583$ | $v_2 = 57.3$ |
| $r_4 = 0.7593$ | $t_4 = 0.0214$ | | |
| $r_5 = 0.8531$ | $t_5 = 0.0439$ | $n_3 = 1.6056$ | $v_3 = 43.9$ |
| $r_6 = 0.2626$ | $t_6 = 0.0395$ | | |
| $r_7 = 0.2812$ | $t_7 = 0.1003$ | $n_4 = 1.5596$ | $v_4 = 61.2$ |
| $r_8 = 1.5406$ | $t_8 = 0.0219$ | | |
| $r_9 = -1.0477$ | $t_9 = 0.0458$ | $n_5 = 1.7495$ | $v_5 = 35.0$ |
| $r_{10} = 0.3742$ | $t_{10} = 0.1371$ | $n_6 = 1.8155$ | $v_6 = 44.4$ |
| $r_{11} = -1.0776$ | $t_{11} = 0.0055$ | | |
| $r_{12} = -35.2349$ | $t_{12} = 0.0740$ | $n_7 = 1.6935$ | $v_7 = 53.4$ |
| $r_{13} = -0.9079$ | $t_{13} = 0.1096$ | | |
| $r_{14} = -0.2124$ | $t_{14} = 0.0186$ | $n_8 = 1.5150$ | $v_8 = 54.3$ |
| $r_{15} = -0.4169$ | | | | where $r_1, r_2 \ldots$ denotes the radii of curvature of the components in the order from the object's side to the image side; $t_1, t_2 \ldots$ the thickness of the components or the air spacing between the components on the optical axis in such order; $n_1, n_2 \ldots$ the refractive indices of the components for the D-line of the spectrum in such order; and $v_1, v_2 \ldots$ the Abbe numbers of the components in such order.

3. A photographic wide-angle objective comprising eighth elements, the first, third and eighth being single negative menisci, the first and third lying with their convex surfaces turned toward the object and the eighth with its convex surface toward the image, the second, fourth and seventh being single positive menisci, the second and fourth lying with their convex surfaces turned toward the object and the seventh with its convex surface toward the image, and the fifth and sixth being respectively a negative and a positive lens air spaced from each other up to about $0.002f$, the arrangement of lenses satisfying the following conditions:

$1.65 n_2 > 1.72$  $\qquad$  $1.76 > n_6 > 1.864$
$1.67 > n_7 > 1.73$  $\qquad$  $0.06 > n_6 - n_5 > 0.115$
$0.25f < r_2 < 0.3f$  $\qquad$  $0.25f < r_3 < 0.35f$
$0.26f < r_7 < 0.35f$  $\qquad$  $f < |r_9| < 1.3f$
$0.8f < |r_{13}| < 1.21f$  $\qquad$  $0.21f < r_{14} < 0.24f$
$0.15f < t_2 < 0.18f$  $\qquad$  $0.32f < t_6 < 0.045f$
$0.02f < t_8 < 0.026f$  $\qquad$  $0.1f < t_{13} < 0.14f$ where $n$ denotes the refractive index for the D-line of spectrum of each lens in the order $n$-subscripts; $r$ the radius of curvature of each lens in the order of $r$-subscripts; $t$ the thickness of each component on the optical axis, or air spacing between components, in the order of $t$-subscripts; and $f$ the overall focal length.

4. A photographic wide-angle objective according to claim 3 and comprising a total of eight component members and satisfying the following conditions:

Overall focal length: $f=1$; relative aperture: 1:5.6; angular field: $2\omega=72°$.

| | | | |
|---|---|---|---|
| $r_1=0.4865$ | $t_1=0.0137$ | $n_1=1.5165$ | $v_1=64.1$ |
| $r_2=0.2711$ | $t_2=0.1637$ | | |
| $r_3=0.2867$ | $t_3=0.0617$ | $n_2=1.6583$ | $v_2=57.3$ |
| $r_4=0.7593$ | $t_4=0.0214$ | | |
| $r_5=0.8531$ | $t_5=0.0439$ | $n_3=1.6056$ | $v_3=43.9$ |
| $r_6=0.2626$ | $t_6=0.0395$ | | |
| $r_7=0.2812$ | $t_7=0.1003$ | $n_4=1.5596$ | $v_4=61.2$ |
| $r_8=1.5406$ | $t_8=0.0219$ | | |
| $r_9=-1.0477$ | $t_9=0.0458$ | $n_5=1.7495$ | $v_5=35.0$ |
| $r_{10}=0.3742$ | $t_{10}=0.1371$ | $n_6=1.8155$ | $v_6=44.4$ |
| $r_{11}=-1.0776$ | $t_{11}=0.0055$ | | |
| $r_{12}=-35.2349$ | $t_{12}=0.0740$ | $n_7=1.6935$ | $v_7=53.4$ |
| $r_{13}=-0.9079$ | $t_{13}=0.1096$ | | |
| $r_{14}=-0.2124$ | $t_{14}=0.0186$ | $n_8=1.5150$ | $v_8=54.3$ |
| $r_{15}=-0.4169$ | | | | where $r_1, r_2 \ldots$ denote the radii of curvature of the components in the order from the object's side to the image side; $t_1, t_2 \ldots$ the thickness of the components or the air spacing between the components on the optical axis in such order; $n_1, n_2 \ldots$ the refractive indices of the components for the D-line of the spectrum in such order; and $v_1, v_2 \ldots$ the Abbe numbers of the components in such order.

References Cited

UNITED STATES PATENTS 2,734,424  2/1956  Bertele _____ 350—215

JOHN K. CORBIN, Primary Examiner

U.S. Cl. X.R.

350—214